UNITED STATES PATENT OFFICE.

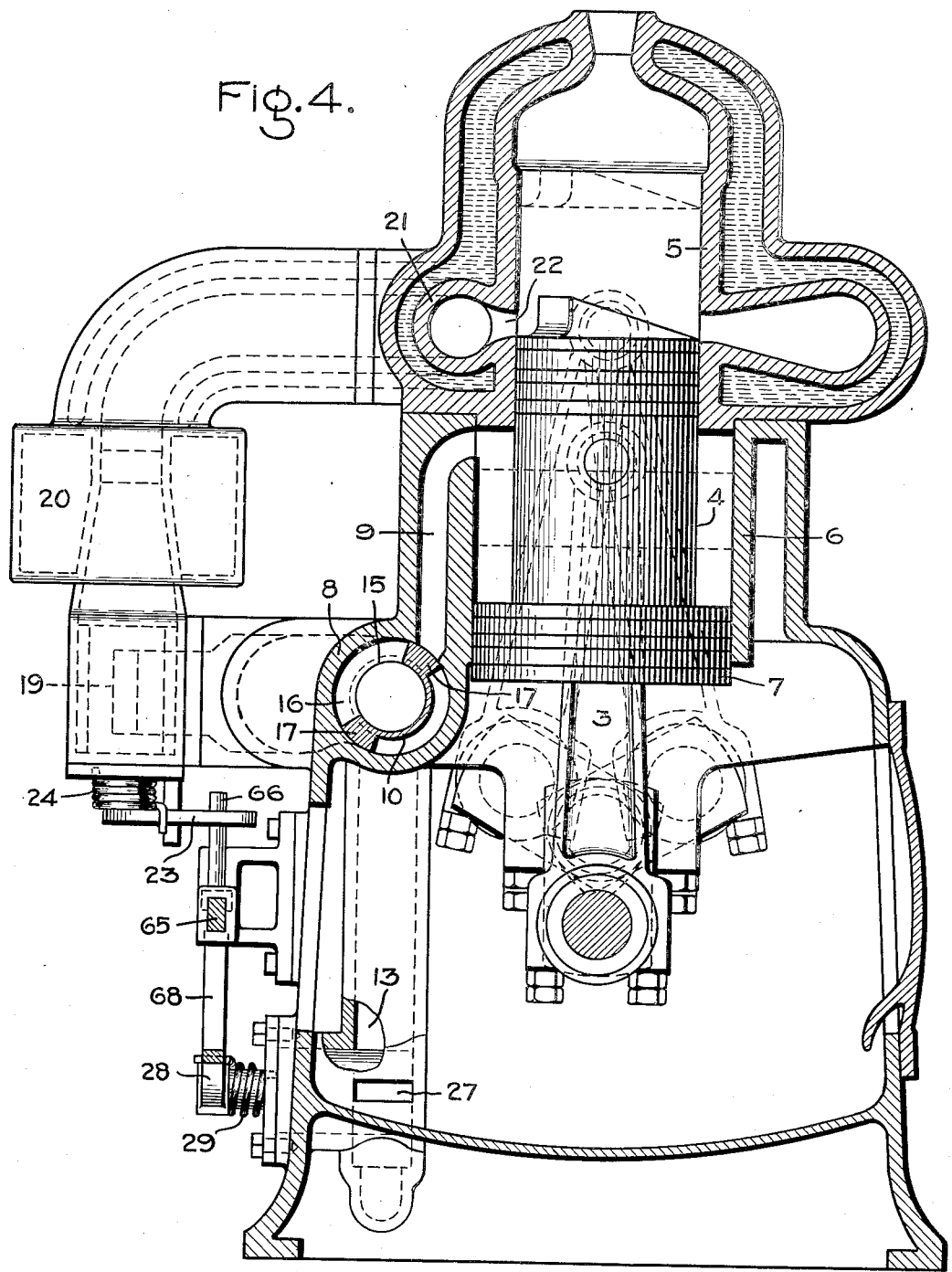

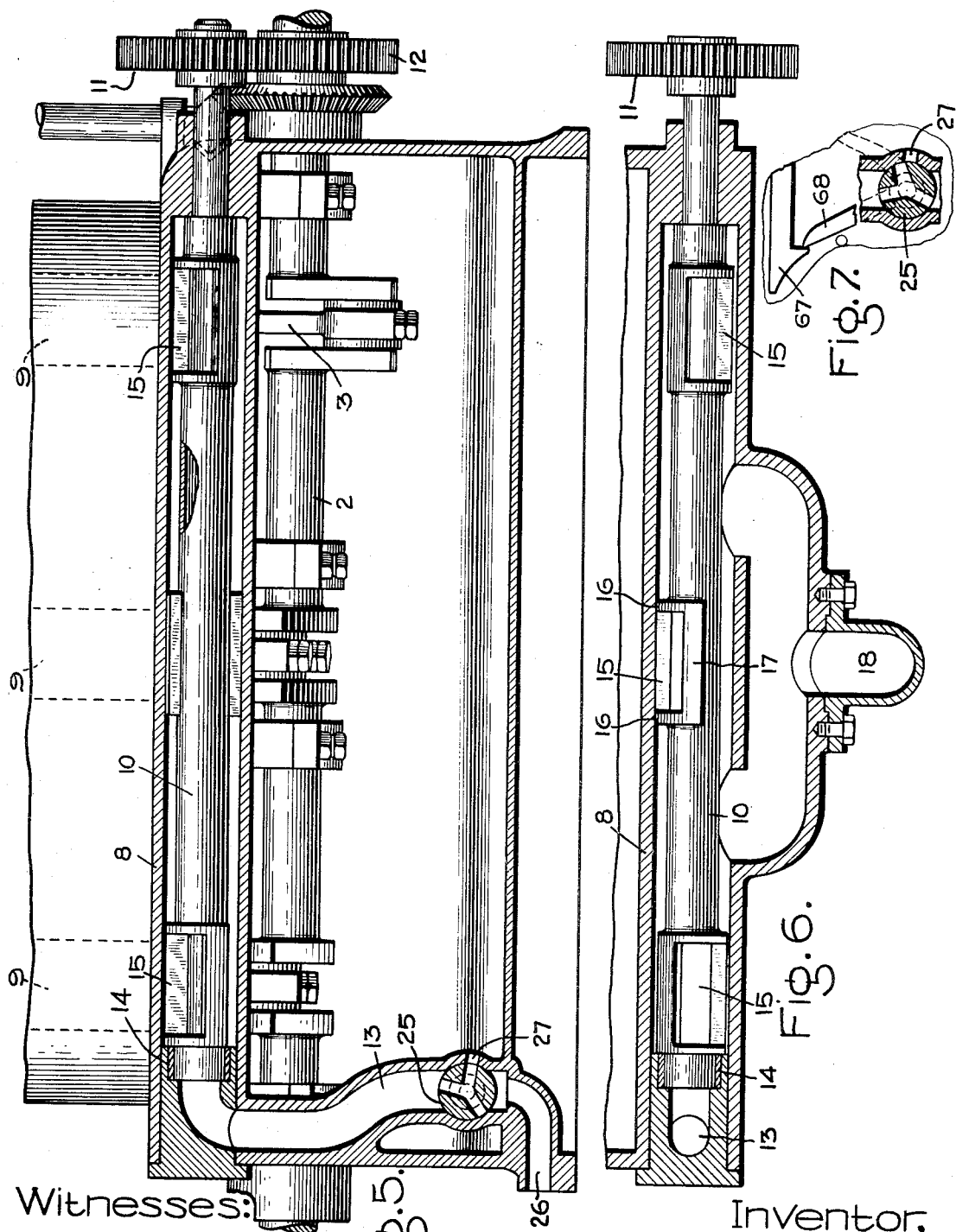

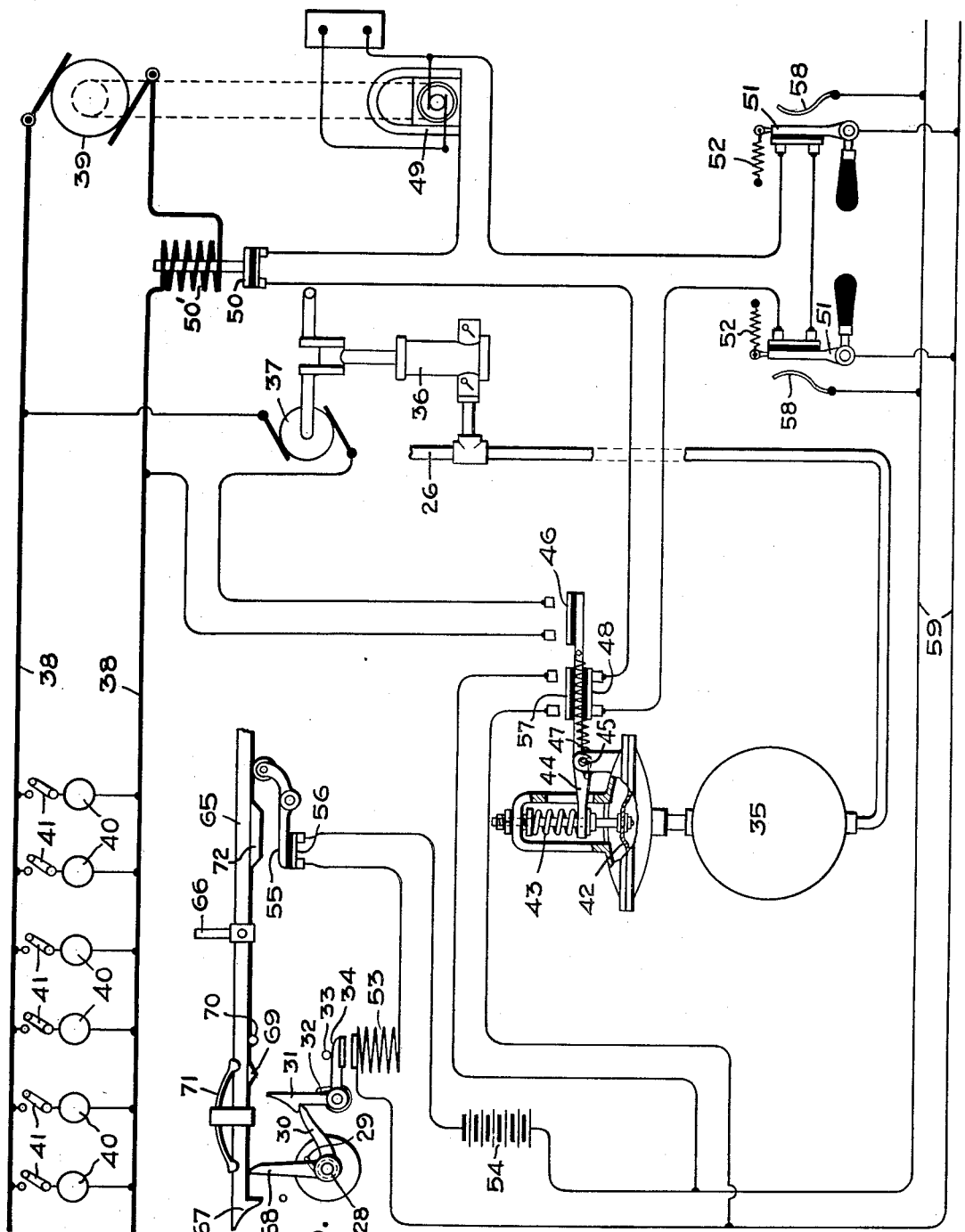

HENRY O. WESTENDARP, OF SAUGUS, MASSACHUSETTS, ASSIGNOR TO GENERAL ELECTRIC COMPANY, A CORPORATION OF NEW YORK.

AUTOMATIC STARTING MECHANISM FOR INTERNAL-COMBUSTION-ENGINE GENERATOR SETS.

1,112,244.  Specification of Letters Patent.  Patented Sept. 29, 1914.

Application filed April 1, 1912. Serial No. 687,636.

*To all whom it may concern:*

Be it known that I, HENRY O. WESTENDARP, a citizen of the United States, residing at Saugus, county of Essex, State of Massachusetts, have invented certain new and useful Improvements in Automatic Starting Mechanism for Internal-Combustion-Engine Generator Sets, of which the following is a specification.

This invention relates to means for starting an internal combustion generator set by motive fluid under pressure, such as compressed air, said means comprising electrical controlling devices whereby the engine can be started or stopped from a distant station.

The invention is especially adapted for isolated plants, and can be used to great advantage on farms or country places where the power plant is located at some distance from the house or other buildings where power or light or both are utilized. By means of the electrical control circuit, having hand-operated switches distributed at convenient points, the engine can be easily started or stopped without the presence of an attendant at the generating station.

The engine may be of either the four cycle or two cycle type but it must have a plurality of cylinders and pistons, and some or all of these must be equipped with pump pistons working in suitable cylinders and of such a number that at least one of them will always be in position to respond to the motive fluid used in starting; the object being to utilize the pumps as starting motors. The function of the pumps is to supply air for the carbureter of the engine. If the starting fluid is compressed air, an air compressor is provided, connected to a storage tank, which in turn is connected to the pump cylinders. The compressor is preferably driven by an electric motor, whose circuit is part of the electrical control system for the generator set. The motor is automatically controlled by a pressure regulator responsive to the air pressure in the storage tank. Located between the tank and the pump cylinders is a valve which can be electrically operated to admit air to the pumps to start the engine, and can be afterward set to cut off the air supply and admit atmospheric air to the pump cylinders for carbureting purposes. This re-setting of the valve is accomplished automatically when the engine gets up to speed, the engine thereafter operating in the usual manner by explosions of the gas supplied through the carbureter.

Figure 1:
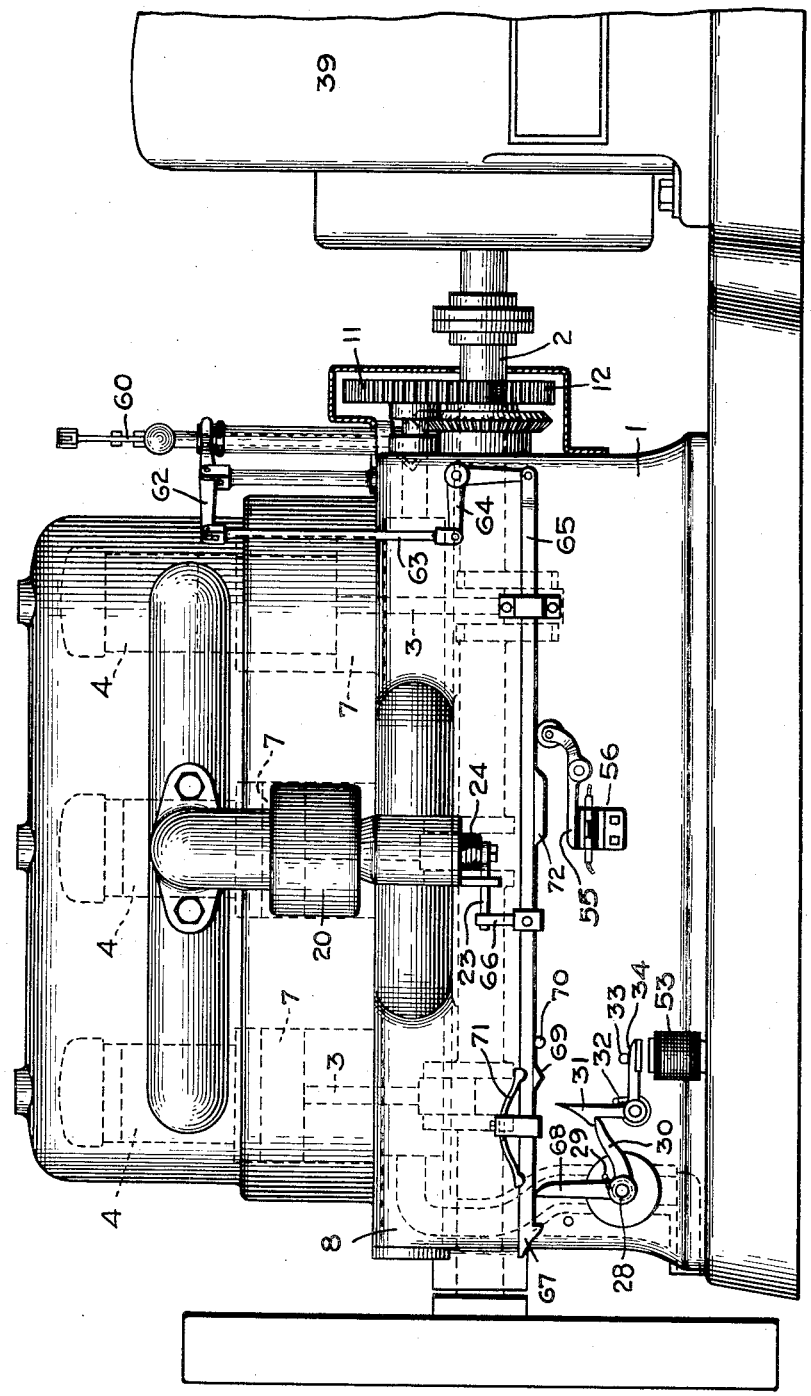
Figure 2:
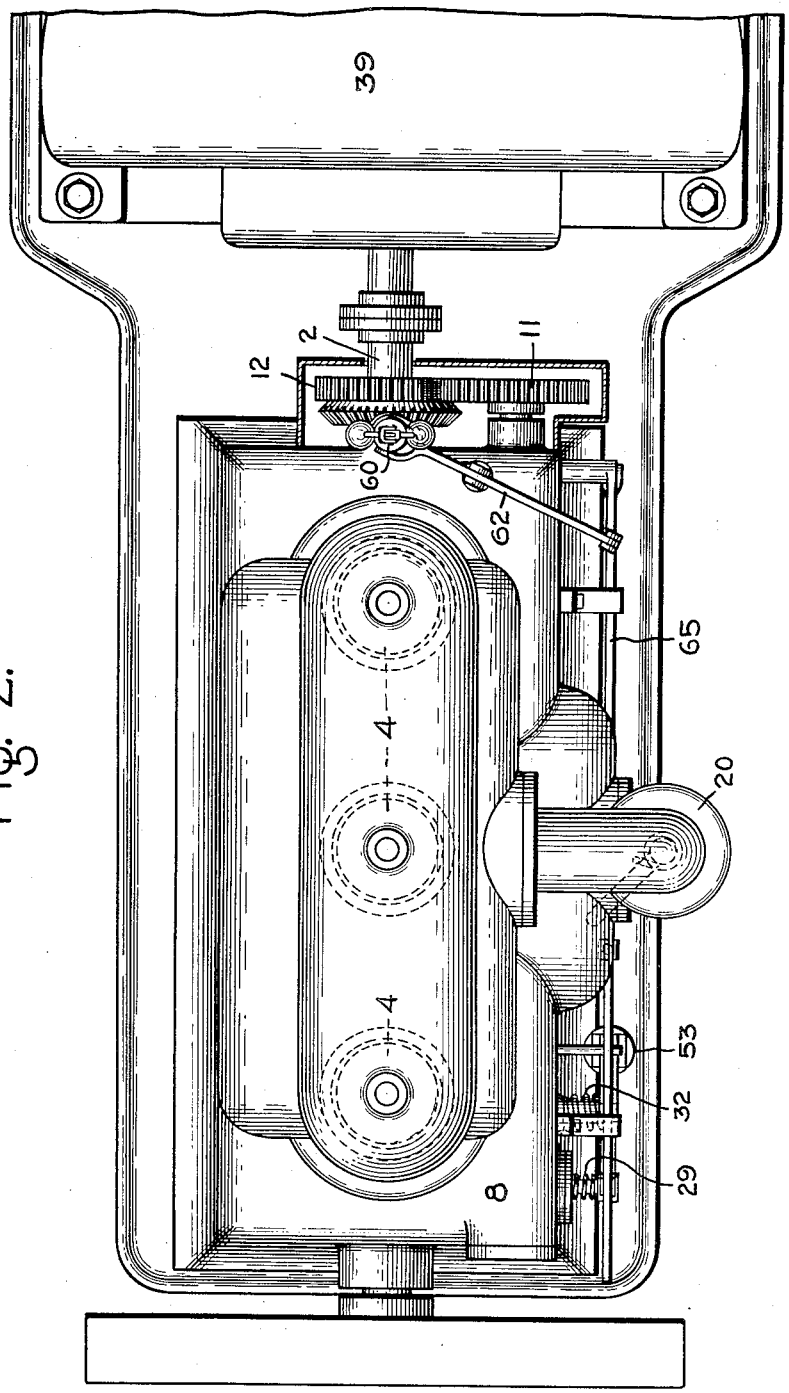
Figure 3:
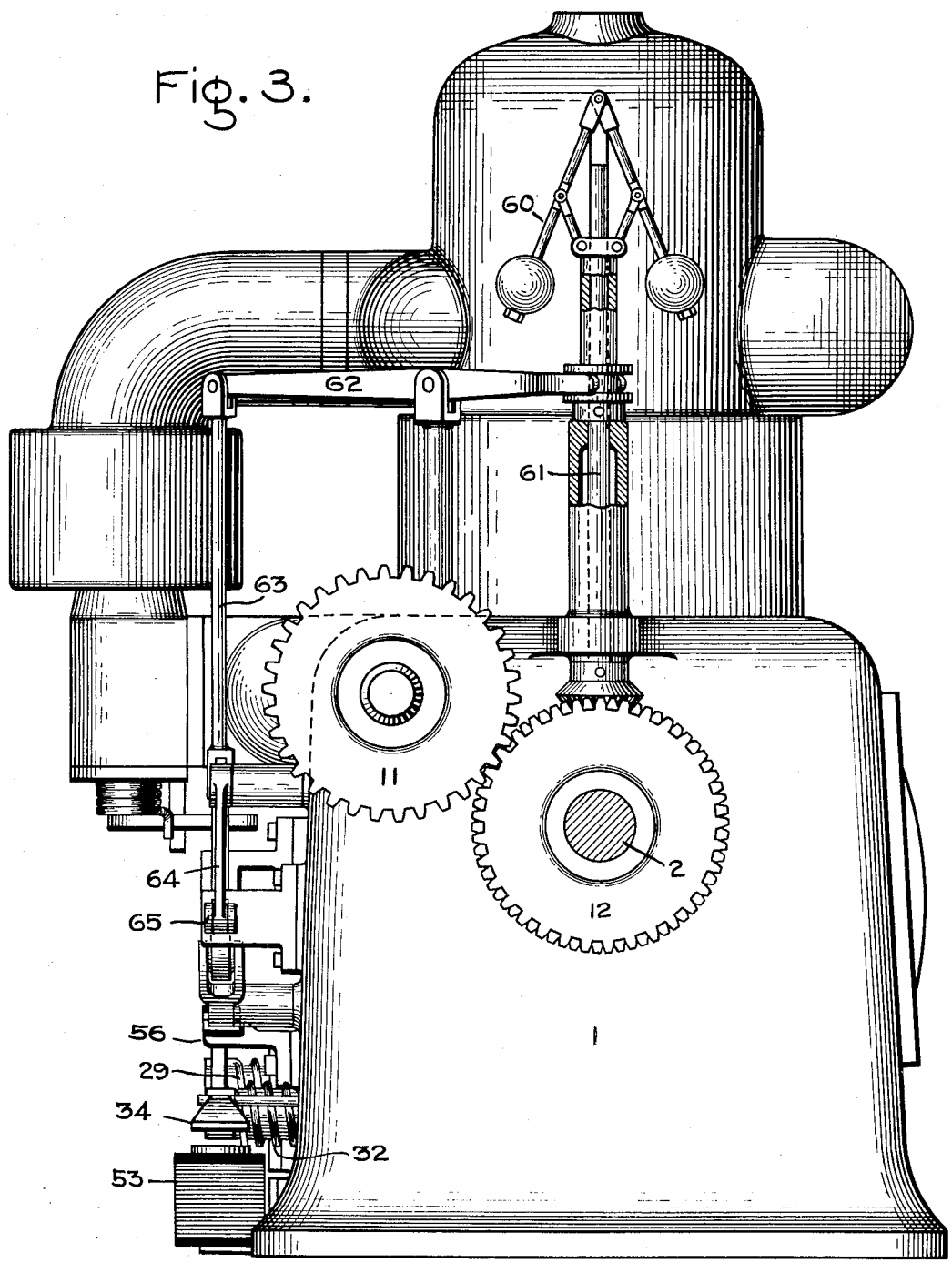

In the accompanying drawing, Figure 1 is a side elevation of a multi-cylinder two-cycle engine connected to a generator and equipped with my invention. Fig. 2 is a plan view of the same. Fig. 3 is an end elevation on a larger scale. Fig. 4 is a vertical cross-section of one of the cylinders and the valve mechanism. Fig. 5 is a longitudinal sectional elevation of the rotary distributing valve and the air inlet pipe. Fig. 6 is a sectional plan view of the rotary valve. Fig. 7 is a section showing the three-way valve, and Fig. 8 is a diagram of electrical circuits and associated devices.

I have chosen to illustrate a two-cycle engine having three cylinders. The cylinders are mounted on a hollow base 1 in which is journaled the crank shaft 2, having three cranks set 120 degrees apart. Each crank is connected by a pitman 3 with a trunk piston 4 working in a water-jacketed cylinder 5. In line with each cylinder is a pump cylinder 6 preferably cast integral with the base 1, and coöperating with a packed head or annular piston 7 on the lower end of the piston 4. The lower end of the cylinder 5 forms the upper end of the annular pump cylinder. A valve casing 8 runs along one side of the base and communicates by passages 9 with the upper end of the pump cylinders. In said casing is a rotary valve 10 somewhat less in diameter than said casing and provided at one end with a gear 11 meshing with a gear 12 of the same size on the crank shaft. This valve is tubular and the end opposite the gear is open to the air inlet passage 13. This end of the valve rotates in an air-tight bearing 14. At three points corresponding with the passages 9, the valve is provided on one side with ports 15 communicating with the hollow interior and staggered 120 degrees apart around the valve so that they will register with their respective passages 9 in succession. Each port covers 120 degrees of the circumference of the valve. At each end of each port is a wall 16 forming a segmental collar on the outside of the valve. Connecting the walls 16 on each side of each port is a longitudinal rib 17 of a width sufficient to close the passage 9 when it coincides therewith. The walls and the ribs make a close fit with the cylindrical interior surface of the casing, so that no air can escape from the hollow interior of the valve into the casing, its only outlet being the passages 9. The casing communicates with a passage 18 leading to a throttle valve 19 which controls the flow of air to a carbureter 20 and thence to the intake 21 which has branches communicating by ports 22 with the several power cylinders 5. The handle 23 of the throttle valve is biased by a spring 24 to the wide open position of said valve.

In the air inlet passage 13 is a three-way valve 25 which in the normal position of running closes the pipe 26 and opens a port 27 leading from the atmosphere into the passage 13, as shown in Fig. 5. The spindle 28 of this valve has an actuating device, such as the helical spring 29, tending to throw the valve to a position in which the port 27 will be closed and the air pipe 26 placed in communication with the passage 13. The spindle 28 is restrained from rotation by an arm 30 which is engaged by a catch 31. A spring 32 urges this catch to its operative position, its limit of movement being determined by a stop 33 with which an elbow lever 34 on said catch or its spindle abuts.

A source of motive fluid, which in the present instance is compressed air, is connected with the pipe 26. This is preferably a storage tank 35, which is supplied with air by a compressor 36, preferably driven by an electric motor 37, taking current from the mains 38 leading from the generator 39 which is directly coupled to the engine. Lamps 40 or other load appliances are connected across said mains, each translating device having its own controlling switch 41. The circuit of the motor 37 is automatically controlled by a pressure responsive device, comprising preferably a diaphragm 42 exposed on one side to the air pressure in the tank 35, which acts against the tension of an adjustable spring 43. A lever 44, fulcrumed at 45, is connected to said diaphragm, so as to partake of its movements. Said lever carries a bridging contact 46 coöperating with two terminals of the motor circuit, so that when the diaphragm 42 flexes by reason of a drop in the air pressure, said circuit will be closed and the compressor motor will be started to pump up the pressure again. Upon the attainment of a predetermined pressure, the lever will be actuated by the diaphragm to open the circuit at the contact 46 and stop the motor. The operation of this lever is made very positive by means of the helical spring 47 so attached to said lever that it is carried across the dead center of the arc of movement of said lever as the diaphragm rises and falls, thus resulting in a snap action of the lever to each of its extremes of movement. As the play of the lever is not great, this insures a full tank pressure before the motor stops.

The bridging contact 46 is of course insulated from the lever. Another insulated contact 48 on said lever operates to close a break in a short circuit around the magneto 49 which furnishes the ignition current for the engine. Another break in said short circuit is controlled by an interlock 50 actuated by an overload magnet 50' in series with the generator 39, and other breaks are controlled by hand switches 51, all arranged in series and normally closed by their springs 52. When these switches are closed, and the generator current is not sufficient to operatively energize the magnet 50', and the tank pressure is up to normal, the short circuit of the magneto will be complete. Said magneto will therefore cease to furnish any ignition current, so that the engine will stop. This is the condition shown in the diagram, Fig. 8.

The catch 31 is controlled by an electromagnet 53 which is in circuit with a battery 54, whose circuit can be closed at three or more points. When the engine is not running, a switch lever 55 keeps the battery circuit closed at the contact 56. When the tank pressure is below normal, said battery circuit will also be closed by a bridging contact 57 on the lever 44. Each of the hand switches 51 has a back contact 58 by means of which it can be caused to close a circuit across the leads 59 and thus enable the battery to energize the magnet 53.

The engine is provided with a speed governor 60 mounted on an upright spindle 61 which is connected by bevel gears with the engine shaft, and which controls through a lever 62, a link 63 and bell crank lever 64, a reciprocating rod 65 carrying an arm 66 which coöperates with the throttle valve lever 23 which regulates the admission of the air from the pump cylinders to the carbureter, and thus keeps the speed of the engine substantially constant under variations in load. The rod 65 has pivoted to it a hook 67 which is adapted to engage an arm 68 on the spindle of the three way valve 25 and pull it over to the position in which it is shown, where the catch 31 can retain it. To permit a further movement of the rod 65 in the same direction after said arm is locked by said catch, the hook is pivoted to said rod and can be lifted by a cam 69 engaging with a fixed lug 70 as the rod passes over it. A spring 71 bears on said hook to keep it normally in line with the arm 68. Another cam 72 on said rod 65 is adapted to engage with and trip the switch lever 55, and hold the circuit of the electromagnet 53 open during the normal operation of the engine. Said cam 72 is rather long, to allow a certain range of movement of the rod under the operation of the speed governor without permitting a closure of the battery circuit.

The operation of the invention is as follows:—Assuming the engine to be standing still, with the parts in the position shown in the drawings, the machine can be started by tripping the catch 31 and permitting the spring 29 to turn the three way cock about forty five degrees in a counter-clockwise direction, which closes the port 27 and connects the air pipe 26 with the inlet pipe 13. The catch is preferably tripped by energizing the electromagnet 53 which can be effected from a distant station by closing the hand switch 51 at that station upon its back stop 58, thus completing the circuit of the battery 54. This operation also opens the ground on the magneto. Compressed air now flows to the pump cylinders from the tank 35 and acts upon the annular pistons 7 to impart rotation to the engine shaft. The air is distributed to the cylinders in succession by the rotary valve 10, and upon exhausting from said cylinders it goes through the casing 8 to the throttle valve 19 and thence to the carbureter, whence the explosive mixture there formed proceeds to the power cylinders 5 by way of the intake 21 and the ports 22. After one or two strokes the engine acquires sufficient speed, running by compressed air, to cause the magneto to operate and furnish ignition current to fire the charges of mixture entering the power cylinders; after which the engine will run by its supply of such mixture. The generator current will quickly pick up the interlock 50 and permanently open the short circuit of the magneto, so that the hand switch 51 may then be allowed to close. The speed governor will gradually draw the rod 65 to the right until its hook 67 pulls the arms 68 and 30 over to the position in which the latter will be engaged and locked by the catch 31. In further movement of this rod to the right, the cam 69 will ride over the fixed lug 70 and lift the hook clear of the arm 68, and the cam 72 will trip the switch lever 55 and keep the battery circuit open, so that the catch 31 cannot be accidentally tripped.

The arm 66 on said rod operates the throttle of the engine through the spring-actuated levers 23 and thus keeps the engine at a constant speed or varies its power to carry the varying load. If the air pressure in the tank 35 drops below a predetermined minimum, the switch lever 44 will be thrown, causing the bridging contact 46 to close the circuit of the electric motor 37 which will start up the air compressor 36 and pump up the pressure again. When the predetermined pressure is reached, the switch lever will be reversed in position, opening the motor circuit and stopping the compressor. If at any time when the engine is at rest, the air leaks out of the tank to such an extent that the lever 44 will be thrown up, this operation not only closes the circuit of the air compressor, but by opening the short circuit of the magneto and closing the battery circuit, will cause the tripping of the catch 31 and the starting of the engine, which will continue to operate until the tank pressure is brought up to normal again, and the switch lever 44 goes back to its normal position, as shown in Fig. 8, thereby stopping the engine. The engine will stop automatically if the tank, being up to pressure so that the motor circuit is opened, all the translating devices across the mains 38 are cut out of circuit, because this allows the interlock 50 to close and complete the short circuit of the igniting magneto, so that the firing of the charges will cease.

It is thus apparent that the invention provides a comparatively simple and efficient generator-set for small installations which can be automatically controlled from a distance, which will automatically stop if the load is taken off, and which will automatically start and pump up the tank pressure in case it drops below a predetermined minimum.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:—

1. The combination with an internal combustion engine, of means for starting said engine by compressed air, a generator driven by said engine, a compressor and a storage tank for the air therefrom which furnishes the compressed air for starting the engine, a motor for driving said compressor which receives current from said generator, a pressure regulator connected to said storage tank for starting and stopping the compressor, an ignition circuit for the engine, and means for rendering the ignition circuit inoperative when current ceases to flow in the circuit of the generator.

2. The combination with an internal combustion engine, of means for starting said engine by compressed air, a valve for controlling the admission of compressed air for such starting purposes, an electromagnet for tripping said valve, switches at distant stations for operating said electromagnet, and an ignition magneto for said engine which is rendered operative by the closing of one of said distant switches.

3. The combination with an internal combustion engine, of means for starting said engine by compressed air, a valve for controlling the admission of compressed air for such starting purposes, an electromagnet for tripping said valve, switches at distant points for operating said electromagnet, an ignition magneto for said engine, and a short circuit for said magneto which is opened when one of said switches is closed to trip said valve.

4. The combination with an internal combustion engine, of means for starting said engine by compressed air, a storage tank for such air, a pressure responsive device connected with said tank, a switch lever operated by said device, an ignition magneto for said engine, and a short circuit for said magneto which is opened by said lever when the air pressure drops below a predetermined minimum.

5. The combination with an internal combustion engine, of means for starting said engine by compressed air, a storage tank for such air, a pressure responsive device connected with said tank, a switch lever operated by said device, a valve for admitting the compressed air for starting purposes, and an electrical tripping device for said valve whose circuit is closed by said lever when the air pressure drops below a predetermined minimum.

6. The combination with an internal combustion engine, of means for starting said engine by compressed air, a storage tank for such air, a pressure responsive device connected with said tank, a switch lever operated by said device, a valve for admitting the compressed air for starting purposes, an electrical tripping device for said valve whose circuit is closed by said lever when the air pressure drops below a predetermined minimum, an ignition magneto for said engine, and a short circuit for said magneto which is opened by said lever when it closes the valve-tripping circuit.

7. The combination with an internal combustion engine, of an electric generator driven therby, means for starting said engine by compressed air, an air compressor, an electric motor for driving the same operated by current from said generator, a storage tank for air, a pressure responsive device connected therewith, and a switch lever operated by said device and controlling the circuit of said motor and means for automatically admitting air from said tank to said starting means when said switch is closed.

8. The combination with an internal combustion engine, of an electric generator driven thereby, means for starting said engine by compressed air, an air compressor, and electric motor for driving the same, a storage tank for air, a pressure responsive device connected therewith, a switch lever operated by said device and controlling the circuit of said motor, a valve for admitting the air for starting the engine, and an electrical device for tripping said valve, adapted to be operated by said switch lever.

9. The combination with an internal combustion engine, of an electric generator driven thereby, means for starting said engine by compressed air, an air compressor, an electric motor for driving the same, a storage tank for air, a pressure responsive device connected therewith, a switch lever operated by said device and controlling the circuit of said motor, an ignition magneto for said engine, a short circuit for said magneto, and means for opening said circuit when the switch lever closes the motor circuit.

10. The combination with an internal combustion engine, of an electric generator driven thereby, an ignition magneto for said engine, a short circuit for said magneto, and an interlock controlling said short circuit and having its operating coil in series with the generator whereby the short circuit will be opened when the generator is operating.

11. The combination with an internal combustion engine, of means for starting said engine by compressed air, a valve controlling said air, a speed governor for said engine, means operated by said governor for shutting said valve as the engine comes up to speed, and a catch for locking said valve shut.

12. The combination with an internal combustion engine, of means for starting said engine by compressed air, a valve controlling said air, an arm on the spindle of said valve, a speed governor for said engine, a bar reciprocated by said governor, a hook on said bar for engaging with said arm to shut said valve, and a catch for locking said valve.

13. The combination with an internal combustion engine, of means for starting said engine by compressed air, a valve controlling said air, an arm on the spindle of said valve, a speed governor for said engine, a bar reciprocated by said governor, a hook on said bar for engaging with said arm to shut said valve, a catch for locking said valve, an electromagnetic tripping device for said catch, and means controlled by said bar for rendering said tripping device inoperative while the engine remains running.

In witness whereof, I have hereunto set my hand this twenty ninth day of March, 1912.

HENRY O. WESTENDARP.

Witnesses:
JOHN A. McMANUS, Jr.,
THURLOW S. WIDGER.